US010673493B2

(12) United States Patent
Cao et al.

(10) Patent No.: US 10,673,493 B2
(45) Date of Patent: *Jun. 2, 2020

(54) LOW-LATENCY INTER-ENODEB COORDINATED MULTI-POINT TRANSMISSION

(71) Applicant: Parallel Wireless, inc., Nashua, NH (US)

(72) Inventors: Yang Cao, Westford, MA (US); Kaitki Agarwal, Westford, MA (US); Sridhar Donepudi, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/299,233

(22) Filed: Mar. 12, 2019

(65) Prior Publication Data

US 2019/0288749 A1  Sep. 19, 2019

Related U.S. Application Data

(63) Continuation of application No. 14/853,647, filed on Sep. 14, 2015, now Pat. No. 10,230,431.

(60) Provisional application No. 62/049,889, filed on Sep. 12, 2014.

(51) Int. Cl.
*H04B 7/024* (2017.01)
*H04W 76/15* (2018.01)
*H04W 28/16* (2009.01)
*H04W 72/12* (2009.01)
*H04W 36/18* (2009.01)

(52) U.S. Cl.
CPC ............ *H04B 7/024* (2013.01); *H04W 28/16* (2013.01); *H04W 76/15* (2018.02); *H04W 36/18* (2013.01); *H04W 72/1278* (2013.01)

(58) Field of Classification Search
None
See application file for complete search history.

(56) References Cited

U.S. PATENT DOCUMENTS

| 9,775,159 B2 | 9/2017 | Kim et al. | |
| 2011/0034171 A1* | 2/2011 | Choi | H04B 7/024 455/436 |
| 2011/0075611 A1* | 3/2011 | Choi | H04L 1/1819 370/329 |

(Continued)

*Primary Examiner* — Kouroush Mohebbi
(74) *Attorney, Agent, or Firm* — Michael Y. Saji; David W. Rouille

(57) ABSTRACT

Systems and methods are disclosed for supporting multi-point transmission. In one embodiment, a system for downlink multi-point transmission are disclosed, comprising: a first base station in radio frequency proximity to a user device and with a established control connection with the user device; a second base station also in radio frequency proximity to the user device; and a coordinating node coupled to the first and the second base station for coordinating transmissions to the first and the second base station to the user device, the coordinating node configured to: select the second base station based on selection criteria, the selection criteria including latency of each base station and perceived signal strength of each base station at the user device; and send scheduling instructions to each of the first and the second base stations to transmit data to the user device.

7 Claims, 7 Drawing Sheets

(56) References Cited

U.S. PATENT DOCUMENTS

| | | |
|---|---|---|
| 2012/0287886 A1 | 11/2012 | Fukuoka et al. |
| 2013/0040683 A1 | 2/2013 | Siomina et al. |
| 2013/0089034 A1* | 4/2013 | Acharya ............... H04W 48/20 |
| | | 370/329 |
| 2013/0258890 A1* | 10/2013 | Li ........................ H04W 24/02 |
| | | 370/252 |
| 2014/0079009 A1 | 3/2014 | Liu et al. |
| 2014/0161060 A1 | 6/2014 | Nam et al. |
| 2015/0163794 A1 | 6/2015 | Liang et al. |
| 2015/0195066 A1 | 7/2015 | Singh et al. |
| 2016/0087769 A1 | 3/2016 | Wild et al. |
| 2016/0165500 A1 | 6/2016 | Hasegawa |
| 2016/0262114 A1 | 9/2016 | Chen et al. |
| 2019/0007996 A1 | 1/2019 | Boudreau et al. |

* cited by examiner

LOW-LATENCY INTER-ENODEB COORDINATED MULTI-POINT TRANSMISSION

CROSS-REFERENCE TO RELATED APPLICATIONS

This application is a continuation of, and claims the benefit under 35 U.S.C. § 120 of, U.S. patent application Ser. No. 14/853,647, filed Sep. 14, 2015 and entitled "Low-Latency Inter-ENodeB Coordinated Multi-Point Transmission," which itself claims the benefit of priority under 35 U.S.C. § 119(e) of U.S. Provisional Patent Application No. 62/049,889, filed Sep. 12, 2014, and entitled "Low-Latency Inter-eNB Coordinated Multi-Point Transmission," which is hereby incorporated by reference in its entirety for all purposes. Additionally, U.S. Pat. App. Pub. Nos. US20140086120, US20140092765, US20140133456, US20150045063, and US20150078167 and U.S. patent application Ser. No. 14/828,432 are hereby incorporated by reference in their entirety for all purposes.

BACKGROUND

Wireless networks, such as Long Term Evolution (LTE) networks that use eNodeB base stations, provide wireless access to user devices. In a typical scenario, a user device that is close to a base station gets stronger signal and consequently better service with lower latency and/or higher data rates, while a user device that is far from a base station gets weaker signal and worse service. The user device that is further away from the base station is sometimes referred to as a cell edge user device. When a user device is farther from a base station, that user device is also more likely to be closer to other base stations, and thus susceptible to interference from the other base stations, further reducing quality of service. Techniques variously described as coordinated multi-point transmission (CoMP) are currently being developed to provide better service to devices at the cell edge.

If a wireless terminal, such as a user equipment (UE), is connected to two or more eNodeBs or other base stations at the same time, both eNodeBs may be used to transmit or receive from the wireless terminal at the same time. This is called coordinated multi-point transmission (CoMP).

SUMMARY

It is possible to use a coordinating node in communication with each of a pair of eNodeBs to facilitate CoMP to and from a UE.

Systems and methods are disclosed for supporting multi-point transmission. In one embodiment, a system for downlink multi-point transmission are disclosed, comprising: a first base station in radio frequency proximity to a user device and with a established control connection with the user device; a second base station also in radio frequency proximity to the user device; and a coordinating node coupled to the first and the second base station for coordinating transmissions to the first and the second base station to the user device, the coordinating node configured to: select the second base station based on selection criteria, the selection criteria including latency of each base station and perceived signal strength of each base station at the user device; and send scheduling instructions to each of the first and the second base stations to transmit data to the user device.

The first and the second base station may be eNodeBs and communicate with the coordinating node via the S1 and X2 protocols. One of the first and second base station may be Wi-Fi base stations. The coordinating node may be further configured to select the first base station and additional base stations. The coordinating node may be configured to send scheduling instructions to each of the first and the second base stations to transmit on a same frequency and a same subframe. The coordinating node may be configured to send scheduling instructions to the first base station to transmit a first subframe during a first slot and the second base station to transmit a second subframe during a second slot. The first and second base stations and the coordinating node each further comprise a scheduler.

In another embodiment, a system for uplink multi-point transmission are disclosed, comprising: a first base station in radio frequency proximity to a user device and with a established control connection with the user device; a second base station also in radio frequency proximity to the user device; and a coordinating node coupled to the first and the second base station for coordinating transmissions to the first and the second base station from the user device, the coordinating node configured to: select the second base station based on selection criteria, the selection criteria including latency of each base station and perceived signal strength of each base station at the user device.

The coordinating node may be further configured to send scheduling instructions to each of the first and the second base stations to receive data from the user device. The selection criteria may further include an uplink traffic pattern of the user device and uplink transmission opportunities allowed to the user device. The selection criteria may further include perceived signal strength of the user device at each base station. The first and the second base station may be eNodeBs and communicate with the coordinating node via the S1 and X2 protocols. Either the first or the second base station, or both, may be Wi-Fi base stations. The coordinating node may be further configured to select the first base station and additional base stations. The first and second base stations and the coordinating node each further comprise a scheduler. The first base station may be a macro cell, and the second base station may be a micro cell whose coverage area may be an underlay coverage area subsumed by a coverage area of the macro cell. The first base station may be used for downlink, the second base station may be used for uplink, and the user device identifies the first and the second base station together using a virtual identifier.

DETAILED DESCRIPTION

Four scenarios for interference mitigation, for mitigating four types of interference, are described. Each of the four scenarios may occur at the same time, or may occur separately. For purposes of the below disclosure, a macro cell base station may be provided that does not perform interference mitigation, and a mobile eNodeB may be provided that is enhanced with the mitigation techniques and methods described herein. A user equipment (UE) that causes interference may be called an aggressor, and a UE that is subject to interference may be called a victim, in some aspects of the below disclosure.

Figure 1:
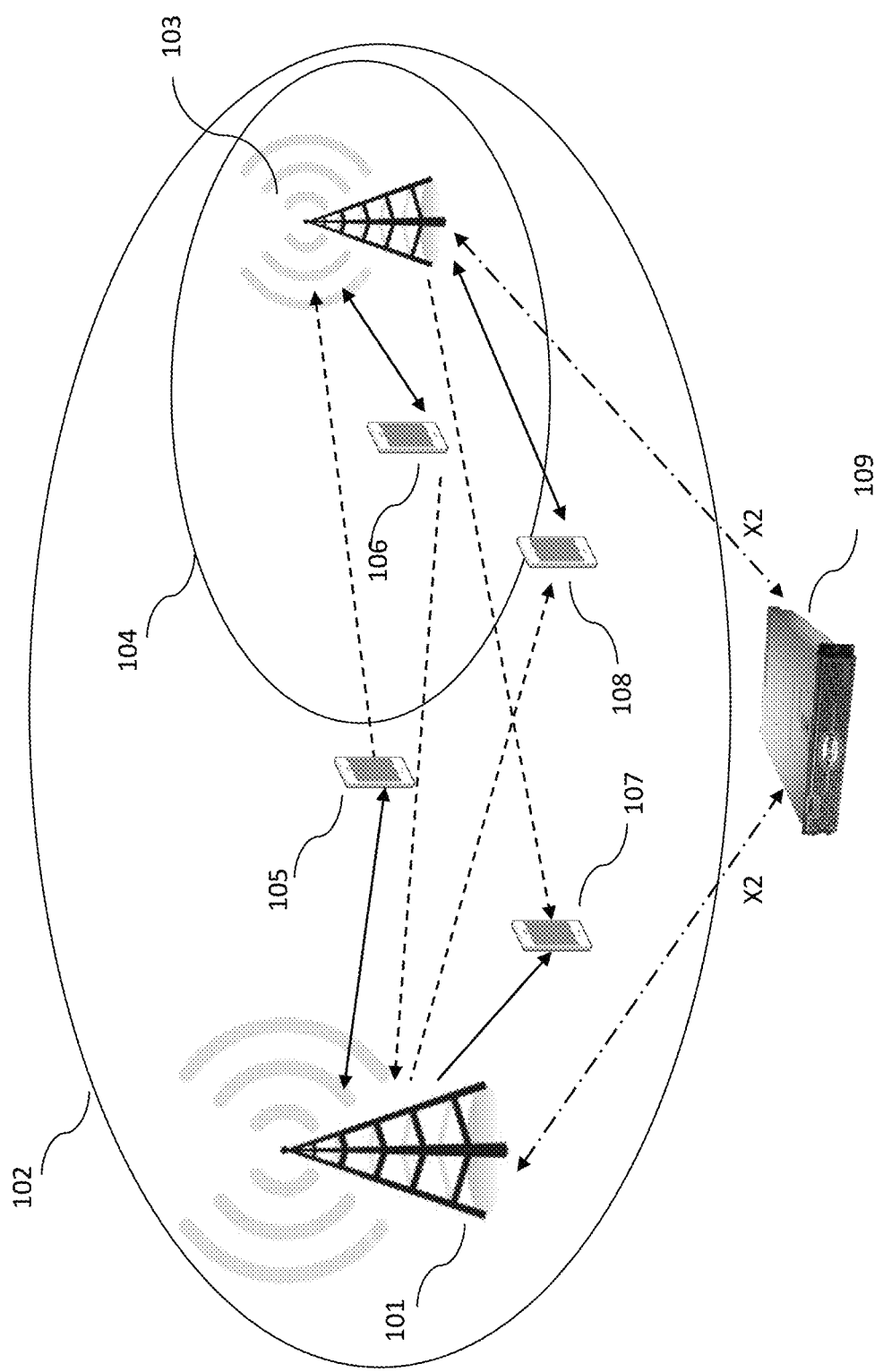
FIG. 1 is a schematic diagram depicting a variety of interference scenarios in a small cell deployment, in accordance with some embodiments.

FIG. 1 is a schematic diagram depicting a variety of interference scenarios in a small cell deployment, in accordance with some embodiments. Macro eNodeB 101 has coverage area 102, and micro eNodeB 103 has coverage area 104. UEs 105, 106, 107, 108 are located in coverage area 102. UEs 106 and 108 are additionally located in coverage area 104. Coordinating node 109 is in communication with eNodeBs 101 and 103 via the X2 protocol as shown, represented by a dot-dashed line. Each of the UEs illustrates a different interference scenario. Desired signals are shown as solid lines and interfering signals are shown as dotted lines.

In a first scenario, UE 105 is attached to (associated with) a macro eNodeB and transmits data to the macro eNodeB, which generates interference on the uplink band for UEs attached to a nearby micro eNodeB. In a second scenario, UE 106 is attached to a micro cell eNodeB and transmits data to the micro cell eNodeB, which generates interference on the uplink band for UEs attached to a nearby macro cell eNodeB. In a third scenario, UE 107 is attached to a macro cell eNodeB and receives data from the macro cell eNodeB, which generates interference on the downlink band for UEs attached to a nearby micro cell eNodeB. In a fourth scenario, UE 108 is attached to a micro cell eNodeB and receives data from the micro cell eNodeB, which generates interference on the downlink band for UEs attached to a nearby macro cell eNodeB. In each scenario, the coordinating node 109 may be used to mitigate interference, as described in U.S. patent application Ser. No. 14/828,432. In addition to mitigating interference, the following disclosure is intended to address how coordinated multi-point transmissions (CoMP) may be used to provide improved performance to the UE.

Figure 2:
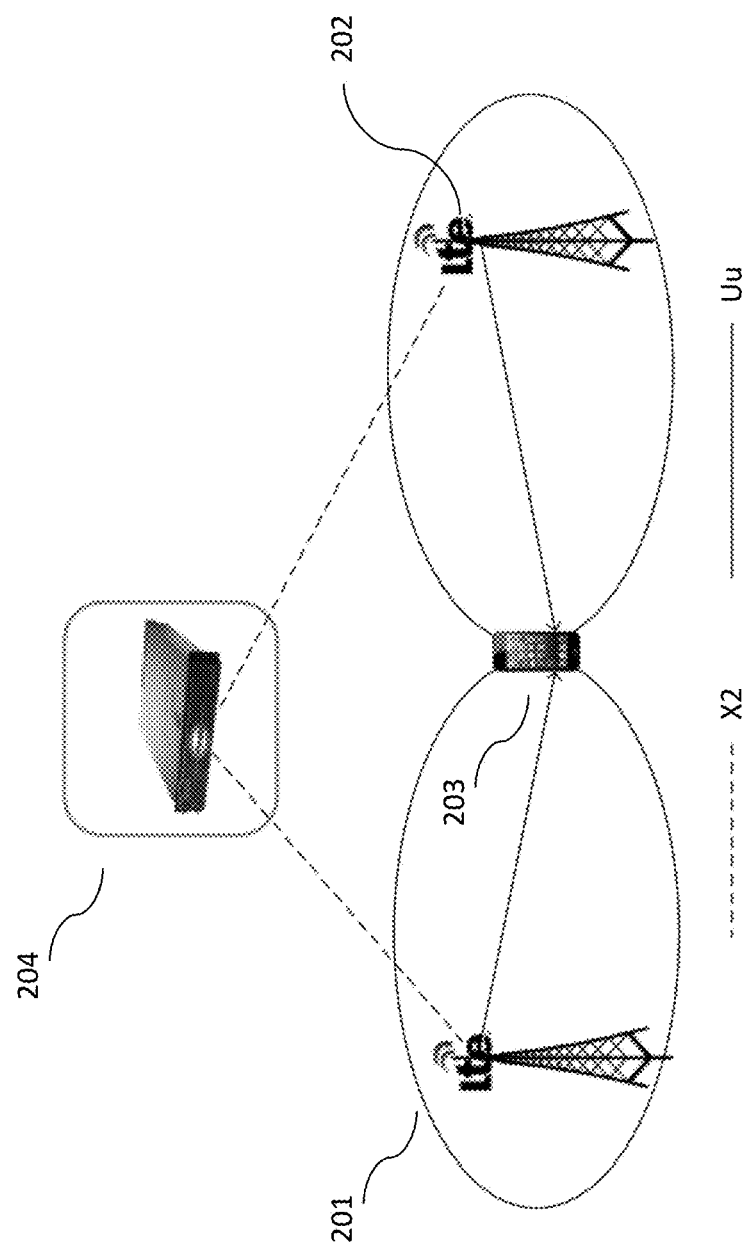
FIG. 2 is a schematic diagram depicting a first scenario showing enhanced inter-eNodeB downlink CoMP, in accordance with some embodiments.

FIG. 2 is a schematic diagram depicting a first scenario showing enhanced inter-eNodeB downlink CoMP, in accordance with some embodiments. U.S. Pat. No. 8,570,963 describes related background and is hereby incorporated by reference in its entirety. Downlink CoMP is a case in which a UE is at an edge of one or more cells, and resources are available to improve performance at the UE by using resources from both the cell edge cell and another cell. FIG. 2 shows this scenario with respect to an enhanced implementation. A UE 203 is connected to a first eNodeB 201. The UE 203 is also at a cell edge of a second eNodeB 202. Both eNodeBs 201 and 202 are coupled to coordinating node 204 over an X2 protocol connection. UE 203 is receiving data from cells 201 and 202 over a Uu protocol connection.

As shown in FIG. 2, the coordinating node 204 can be used to determine a cluster (two or more) of eNodeBs that can either perform coherent joint transmission or dynamic point selection. UE 203 sends measurement reports to its associated eNodeB 201 that include signal strength and quality measures such as received signal strength indications (RSSI) of eNodeB 201. This allows eNodeB 201 to know that UE 203 is at a cell edge. UE 203 also sends information about neighboring cells, even though it is still attached to eNodeB 201. This allows eNodeB 201 to know that a UE may be in a region where CoMP may be used to increase downlink speed. Base station/eNodeB 201 sends messages to coordinating node 204 to pass some or all information to coordinating node 204. These messages may be measurement reports, periodic scheduling messages, or other messages. These messages may be passed using a protocol such as the X2 protocol, or another protocol. In some embodiments, controller 204 may have a scheduler, or base stations 201, 202 may have schedulers, or schedulers may be present at each node and synchronized.

For downlink CoMP, two types of CoMP may be determined by the coordinating node: coherent joint transmission, and dynamic point selection. These approaches may be used in conjunction to improve downlink network performance at the cell edge.

In coherent joint transmission, two or more cells may be coordinated to transmit on the same frequency in the same subframe during a scheduling interval. Normally, if two cells transmit on the same frequency and in the same subframe, with different signals to different UEs in the common, non-CoMP case, the transmissions interfere with each other. Coherent joint transmission causes both eNodeBs, here 201 and 202, to send the same signal at the same time in the same subframe. UE 203 is able to receive the data signal with a greater receive strength, enabling a higher data rate to the UE. Coherent joint transmission may be initiated by the coordinating node when a UE is identified to be in a coverage area at the edge of two eNodeBs, and may continue until the UE enters into a strong coverage area where it can receive more direct high-speed transmissions from a particular eNodeB.

In some embodiments, the coordinating node may dynamically select a set of cells to perform one or more of these methods, based on information about what cell edges the UE is on at the current time. For example, the coordinating node may select eNodeBs 201 and 202 to perform downlink CoMP to UE 203, or it may select eNodeB 201 (i.e., the serving cell) and any other non-serving cell or eNodeB. The coordinating node may monitor messages from the UE via one or more eNodeBs. The coordinating node may initiate and terminate coherent joint transmission. The coordinating node may use other information, such as terrain, foliage, interfering signals in the area, UE velocity, or other information to determine whether to turn on or off coherent joint transmission. In some cases, more than two eNodeBs may be selected to transmit, i.e., when the UE is in an edge coverage area of three cells or more cells. These node selection mechanisms may be used in conjunction with any of the uplink or downlink CoMP methods described elsewhere herein.

Additionally, in the coherent joint transmission scenario, as the coordinating node has an Coordinating node 304 may dynamically determine a set of two or more cells to be used as a joint reception cluster, and may select the serving cell as well. When selecting the cluster connection with each cell, the coordinating node may be used to provide low-latency X2 forwarding to all members of the cluster selected by the coordinating node. For example, if a UE is selected for coherent joint transmission, the same information signal may be sent to all eNodeBs selected for transmission during the designated frequency and subframe. Using an X2 forwarding tunnel from the coordinating node to each of the selected eNodeBs, the information signal may be sent efficiently to each of the nodes without burdening the network. These node selection mechanisms may be used in conjunction with any of the uplink or downlink CoMP methods described elsewhere herein.

In some embodiments, the coordinating node may dynamically select two or more cells to provide dynamic point selection. In the set of selected cells, one cell may be scheduled to transmit the subframe to the UE in a particular slot. Another cell may be scheduled to transmit another subframe to the UE in another slot, and so on. Selection of the single transmitting cell may be performed at the coordinating node. In some embodiments, selection of the cell may also be performed using information received from each of the base stations, such as measurement reports. Selection of the cell may be based on various factors, such as a position, velocity or acceleration of a UE, a deduced direction of a UE based on weakening and strengthening signal strength, radio pre-planning, manual selection, historical factors, statistical factors, or other factors. For example, if a UE is moving along a highway and measurement reports show one historical pattern for UEs moving north and another pattern for UEs moving south, the coordinating mode may be able to provide dynamic point selection for the UE to send data to the UE from successive eNodeBs selected from the direction of motion of the UE. These node selection mechanisms may be used in conjunction with any of the uplink or downlink CoMP methods described elsewhere herein.

Scheduling decisions may be performed at the coordinating node, or at the base stations. Scheduling hints may be provided from the coordinating node to the base stations, for specific subframes, specific UEs, specific frequencies, or some combination thereof. Operational data may be sent to the coordinating node and historical data may be preserved at the coordinating node for analysis. An operator or an automated heuristic may be used for analysis.

If a UE appears to be exiting an area of signal, CoMP processing may be terminated or activated, depending on what measures will be appropriate to preserve signal. For example, coherent joint transmission may be used to communicate to a UE that is experiencing high interference.

Figure 3:
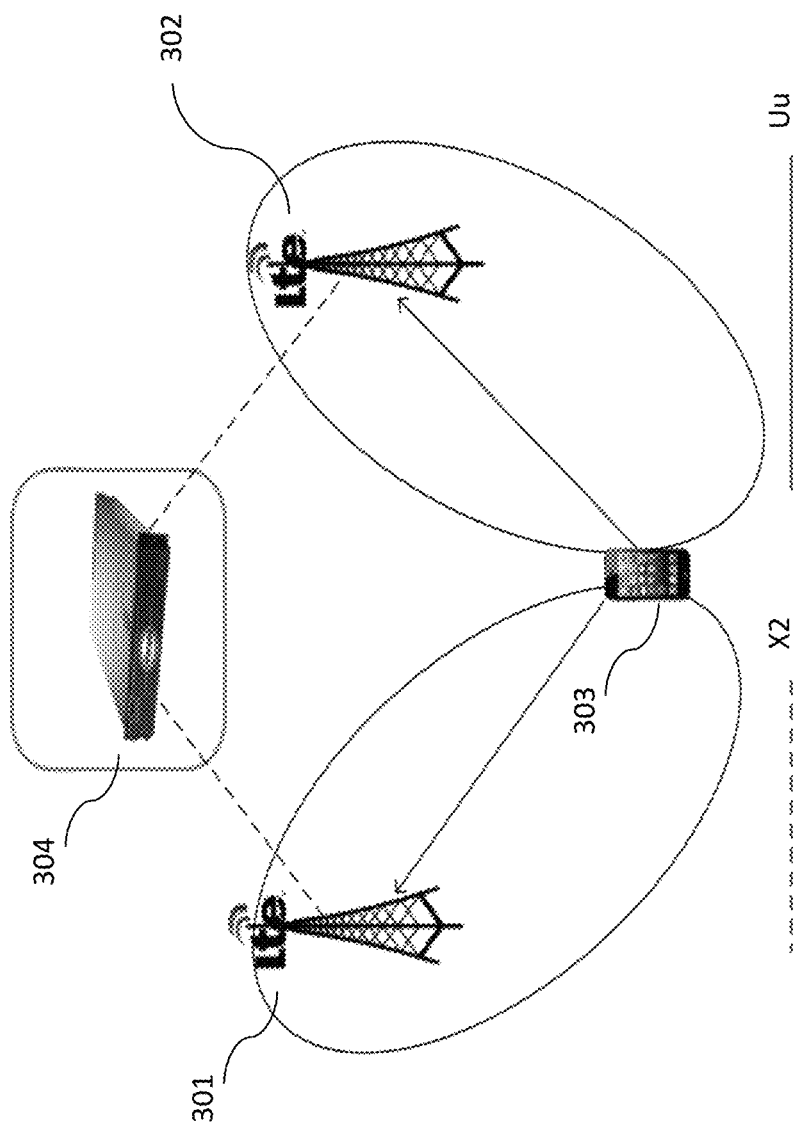
FIG. 3 is a schematic diagram depicting a second scenario showing enhanced inter-eNodeB uplink CoMP, in accordance with some embodiments.

FIG. 3 is a schematic diagram depicting a second scenario showing enhanced inter-eNodeB uplink CoMP, in accordance with some embodiments. A UE 303 is connected to a first eNodeB 301. The UE 303 is also at a cell edge of a second eNodeB 302. Both eNodeBs 301 and 302 are coupled to coordinating node 304 over an X2 protocol connection. UE 303 is attached to serving cell 301. UE is also in range of non-serving cell 302. UE 303 is transmitting data to cells 301 and 302 over a Uu protocol connection, and cell 301 and 302 are being used together for receiving uplink data from UE 303, e.g., for uplink CoMP.

Ericsson (WO2014062104A1, hereby incorporated by reference in its entirety) explains and describes uplink CoMP as understood in the prior art. One issue with uplink CoMP is that a backhaul interface is needed between the non-serving cell and the serving cell. In this scenario, a coordinating node may be used to provide low-latency X2 forwarding from the non-serving cell to the serving cell, in some embodiments.

Note that in Ericsson's patent publication, a full-mesh backhaul connection topology is required between the eNodeBs to ensure that the cluster is flexibly formed. This mesh backhaul configuration requires $N^2$ links between each cell in the cluster. However, in some embodiments, by using the coordinating node as an X2 anchor point, this $N^2$ connectivity can be effectively reduced to N links, simplifying the X2 forwarding topology significantly.

In both of these two cases, as we can see, the use of a coordinating node in communication with each cell may provide one or more extremely low-latency X2 forwarding data paths in addition to the other cluster selection function.

To provide extreme low-latency forwarding paths, we can use the quality-of-service (QoS) scheduling provided by the coordinating node, particularly since the coordinating node may be in the data path and/or may be session-aware. Among all the data session paths, the coordinating node may make sure the X2 forwarding path will be given the highest scheduling priority. This provides session and QoS awareness. Also, because the coordinating node knows the X2 forwarding latency for each eNodeB, the coordinating node may take this information into account when selecting a cluster for providing either uplink or downlink CoMP. The coordinating node may be configured to incur latency of no more than 5 ms (i.e., introduced insertion delay), to provide high performance. In the case that latency exceeds 1 ms, a buffer may be used at the serving cell.

In this second scenario, because it is designed to optimize or improve UL traffic, we also have conceived some Internet of Things (IoT) application scenarios: most of the machine-to-machine (M2M) applications are uploading the sensor data with a fixed pattern (interval). The coordinating node can take this pattern into account and pick the UL reception cluster in a semi-static way and allocate the UL resource via semi-persistent scheduling across all cluster member eNodeBs. In this way, not only can we improve the UL delivery spectrum efficiency, we can also significantly reduce the PDCCH/CCE resources needed to make this work.

Coordinating node 304 may dynamically determine a set of two or more cells to be used as a joint reception cluster, and may select the serving cell as well. When selecting the cluster, the clustering criteria may include one or more of the following factors: joint signal to noise ratio (SINR); backhaul capacity and latency of each cell; a specific uplink traffic pattern of the UE; allowed uplink transmission opportunities; or other parameters.

A single cell may be a serving cell. The serving cell may be determined by the coordinating node. The coordinating node may determine which cell will send at a given time, even when a single serving cell is assigned. Thus, using coordination at the coordinating node, the time domain may be used to shift interference from one cell area to another. In some cases, a virtual cell may be used.

In this scenario, support for these features is not needed within the UE.

Figure 4:
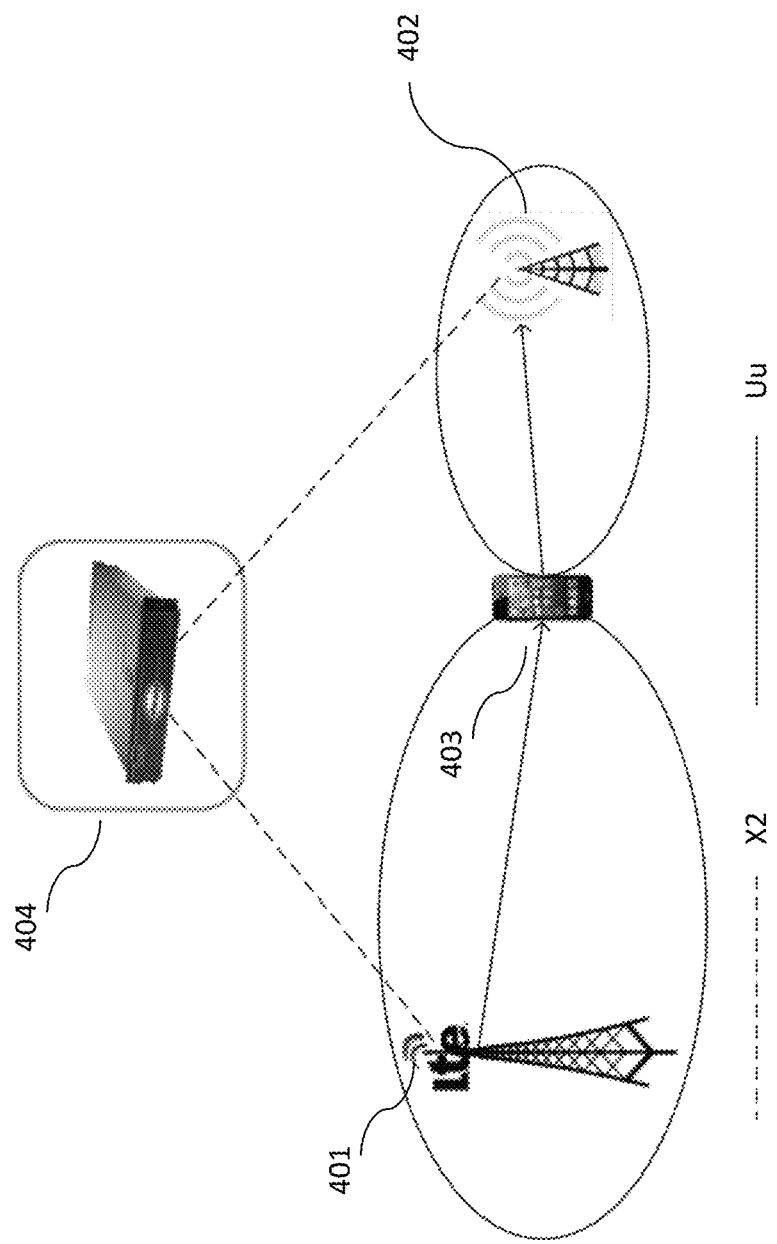
FIG. 4 is a schematic diagram depicting a third scenario showing enhanced inter-eNodeB heterogeneous CoMP, in accordance with some embodiments.

FIG. 4 is a schematic diagram depicting a third scenario showing enhanced inter-eNodeB heterogeneous CoMP, in accordance with some embodiments. In some cases, a coordinating node may not be involved in the related data path for either downlink (DL) or uplink (UL), but may still be involved in providing CoMP, for example, to mitigate heterogeneous network interference. A UE 403 is connected to a first eNodeB 401, which may be a macro cell. The UE 403 is also at a cell edge of a second eNodeB 402, which may be a micro cell. Both eNodeBs 401 and 402 are coupled to coordinating node 404 over an X2 protocol connection. UE 403 is attached to serving cell 401. UE is also in range of non-serving cell 402. UE 403 is receiving data from serving cell 401 via a Uu connection, and is transmitting data to non-serving cell 402 via a Uu connection. In this scenario, the coordinating node is primarily serving as the coordination point, identifying the appropriate macro and micro to provide DL and UL respectively by creating and coordinating a virtual cell.

A virtual cell, as shown in FIG. 4, is useful in cases where, for example, the UE is closer to a micro cell than a macro cell. This coverage scenario is a common case in heterogeneous network deployments with small cell underlay, wherein a macro cell provides umbrella coverage and multiple small cells are deployed within the coverage area of the macro cell to improve coverage and throughput. As UE radios do not have high power, uplink bandwidth is improved when the small cell is closer to the UE radio.

Coordinating node 404, in this case, dynamically coordinates between the macro cell 401 and small cell 402, for example using the X2 interface. Coordinating node 404 may also be involved in selecting cell 401 and 402. The UE receives its downlink signal from macro cell 401 and sends its uplink signal to small cell 402, where small cell 402 has been selected by coordinating node 404. UE 403 may support the use of a virtual cell ID, for example, as specified in 3GPP LTE Release 11, which enables the use of cells 401 and 402 as a single cell. As UE 403 moves, it may use different small cells for uplink. Selection of cells may be performed at the coordinating node, as described elsewhere herein.

In some embodiments, scheduling instructions may be sent to a scheduler located at the serving cell, another cell, or an entire cluster of cells providing uplink or downlink service to a UE. These scheduling instructions may include information for scheduling regular data transfers at intervals. Scheduling hints like these can be useful for not only providing Voice over LTE (VoLTE) service, which requires data transfer at regular intervals to accommodate data from a LTE voice codec, but also for enabling new Internet of Things (IoT) devices like parking meters to set up schedules for transferring regular, small amounts of data. LTE semi-persistent scheduling (SPS) can be adapted for this purpose, and the scheduling instructions may include a 3-tuple of information consisting of when to start a regularly scheduled time slot, when to stop, and the length of the interval during which the scheduling rule should apply. Additionally, the amount of data to be sent may also be sent as scheduling information.

In some embodiments, base stations that belong to a cluster may be selected based on a number of criteria, including latency of each base station and perceived signal strength of each base station at the user device. These windows of uplink transmission opportunities may also be used as selection criteria for adding base stations to a cluster. For example, the selection criteria may include an uplink traffic pattern of a user device. The selection criteria may also include uplink transmission opportunities allowed to the user device. These characteristics around the data to be transmitted, i.e., an uplink traffic pattern, may also be used as selection criteria. In an exemplary scenario, a parking meter at a cell edge may have a data transfer pattern of 100 kilobytes every 5 minutes, and a coordinating node may select a cluster of cells that can accommodate the transfer pattern to serve as an uplink CoMP cluster.

Instead of using the X2 interface or protocol, another interface may be used. For example, the coordinating node may direct an eNodeB to work with a Wi-Fi base station. When the Wi-Fi base station understands the X2 protocol, an X2 connection may be used, but if the Wi-Fi base station does not understand the X2 protocol, translation or interworking, or de- and re-encapsulation may be performed at the coordinating node to provide user data forwarding over another type of tunnel, such as a GRE or IPSEC tunnel. This enables the coordinating node to knit together a heterogeneous, multi-radio access technology (multi-RAT) network. The X2-to-GRE functionality may be used in conjunction with any of the embodiments described herein, including the embodiments of FIGS. 2 and 3.

Figure 5:
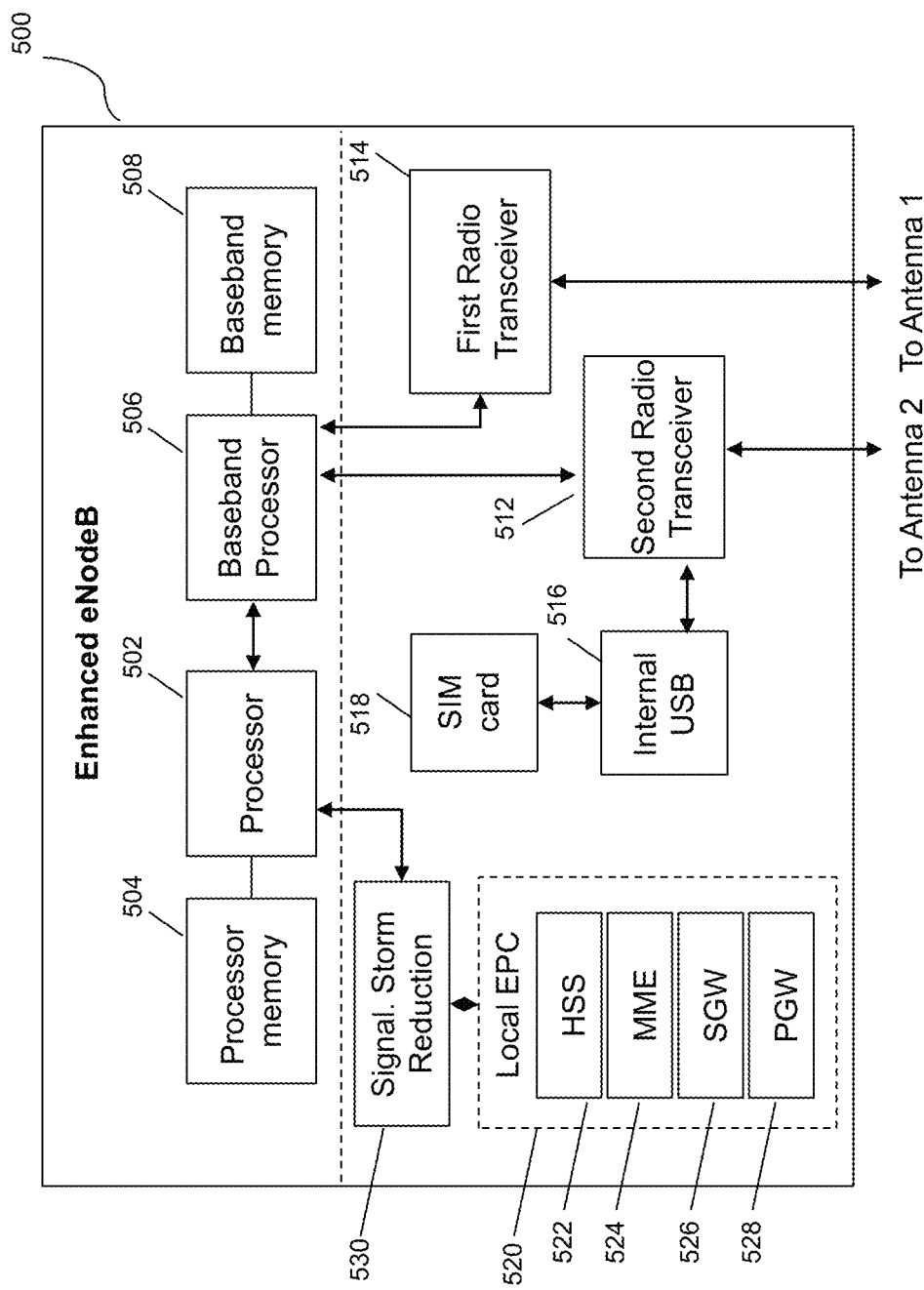
FIG. 5 is a schematic diagram of an enhanced eNodeB, in accordance with some embodiments.

FIG. 5 is a schematic diagram of an enhanced eNodeB, in accordance with some embodiments. Enhanced eNodeB 500 may include processor 502, processor memory 504 in communication with the processor, baseband processor 506, and baseband processor memory 508 in communication with the baseband processor. Enhanced eNodeB 500 may also include first radio transceiver 510 and second radio transceiver 512, internal universal serial bus (USB) port 516, and subscriber information module card (SIM card) 518 coupled to USB port 514. In some embodiments, the second radio transceiver 512 itself may be coupled to USB port 516, and communications from the baseband processor may be passed through USB port 516.

A signaling storm reduction module 530 may also be included, and may be in communication with a local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. SSR module 530 and local EPC 520 may each run on processor 502 or on another processor, or may be located within another device.

Processor 502 and baseband processor 506 are in communication with one another. Processor 502 may perform routing functions, and may determine if/when a switch in network configuration is needed. Baseband processor 506 may generate and receive radio signals for both radio transceivers 510 and 512, based on instructions from processor 502. In some embodiments, processors 502 and 506 may be on the same physical logic board. In other embodiments, they may be on separate logic boards.

The first radio transceiver 510 may be a radio transceiver capable of providing LTE eNodeB functionality, and may be capable of higher power and multi-channel OFDMA. The second radio transceiver 512 may be a radio transceiver capable of providing LTE UE functionality. Both transceivers 510 and 512 are capable of receiving and transmitting on one or more LTE bands. In some embodiments, either or both of transceivers 510 and 512 may be capable of providing both LTE eNodeB and LTE UE functionality. Transceiver 510 may be coupled to processor 502 via a Peripheral Component Interconnect-Express (PCI-E) bus, and/or via a daughtercard. As transceiver 512 is for providing LTE UE functionality, in effect emulating a user equipment, it may be connected via the same or different PCI-E bus, or by a USB bus, and may also be coupled to SIM card 518.

SIM card 518 may provide information required for authenticating the simulated UE to the evolved packet core (EPC). When no access to an operator EPC is available, local EPC 520 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 510 and 512, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 502 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 510 and 512. Baseband processor 506 may use memory 508 to perform these tasks.

Figure 6:
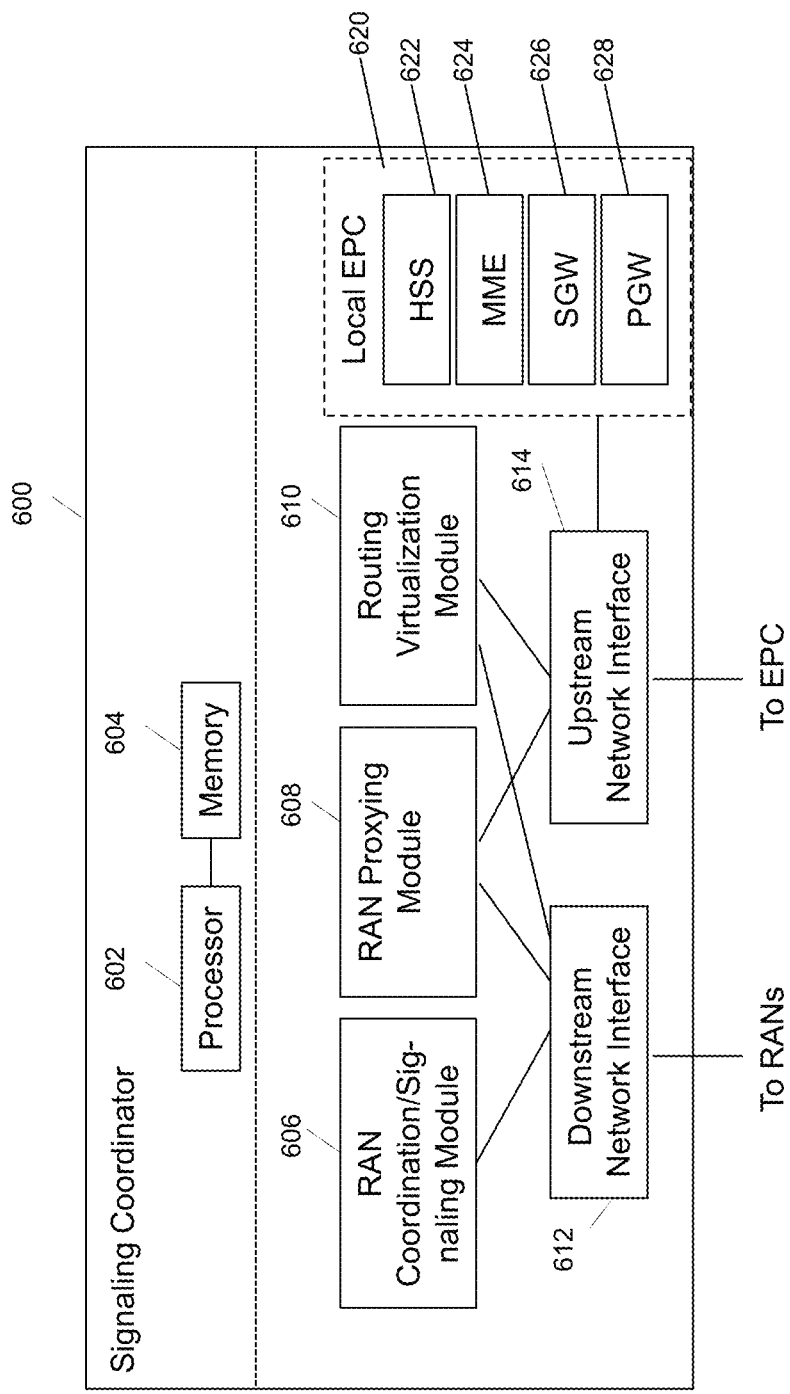
FIG. 6 is a schematic diagram of a signaling coordinator server, in accordance with some embodiments.

FIG. 6 is a schematic diagram of a signaling coordinator server, in accordance with some embodiments. Signaling coordinator 600 includes processor 602 and memory 604, which are configured to provide the functions described herein. Also present are radio access network coordination/signaling (RAN Coordination and signaling) module 606, RAN proxying module 608, and routing virtualization module 610. In some embodiments, coordinator server 600 may coordinate multiple RANs using coordination module 606. In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet). Signaling storm reduction functions may be performed in module 606.

Signaling coordinator 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

Figure 7:
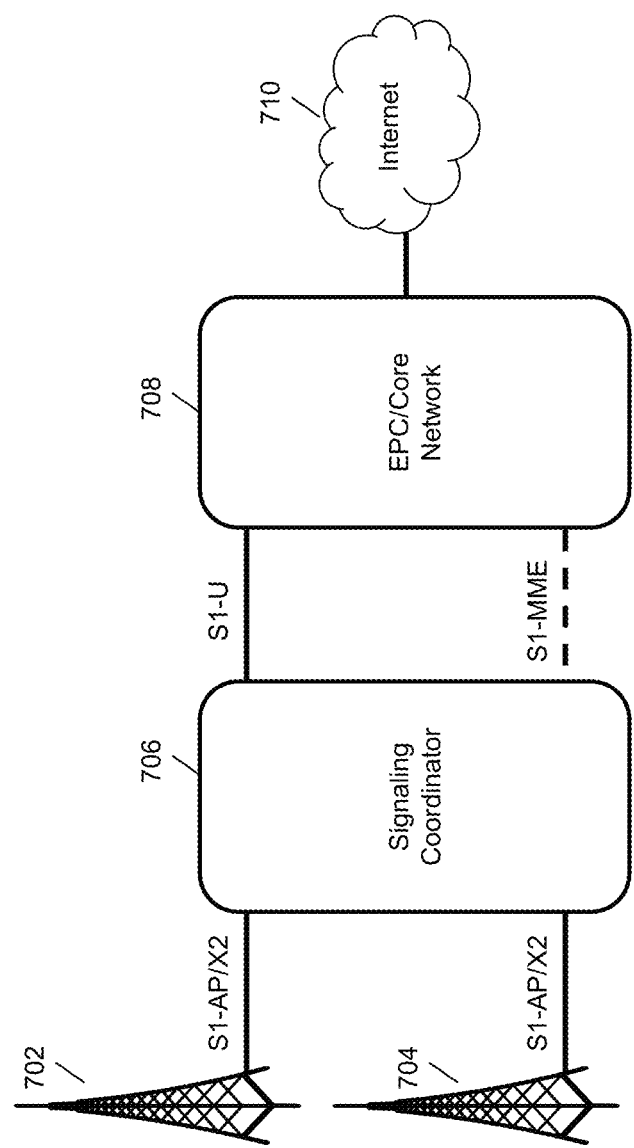
FIG. 7 is a system architecture diagram of an exemplary network configuration, in accordance with some embodiments.

FIG. 7 is a system architecture diagram of an exemplary network configuration, in accordance with some embodiments. Base stations 702 and 704 are connected via an S1-AP and an X2 interface to coordination server 706. Base stations 702 and 704 are eNodeBs, in some embodiments. Coordination server 706 is connected to the evolved packet core (EPC)/Core Network 708 via an S1 protocol connection and an S1-MME protocol connection. Coordination of base stations 702 and 704 may be performed at the coordination server. In some embodiments, the coordination server may be located within the EPC/Core Network 708. EPC/Core Network 708 provides various LTE core network functions, such as authentication, data routing, charging, and other functions. In some embodiments, mobility management is performed both by coordination server 706 and within the EPC/Core Network 708. EPC/Core Network 708 provides, typically through a PGW functionality, a connection to the public Internet 710.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems. Wherever IMSI or IMEI are mentioned, other hardware, software, user or group identifiers, can be used in conjunction with the techniques described herein.

Those skilled in the art will recognize that multiple hardware and software configurations could be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention could be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

Although the scenarios for interference mitigation are described in relation to macro cells and micro cells, or for a pair of small cells or pair of macro cells, the same techniques could be used for reducing interference between any two cells, in which a set of cells is required to perform the CoMP methods described herein. The applicability of the above techniques to one-sided deployments makes them particularly suitable for heterogeneous networks, including heterogeneous mesh networks, in which all network nodes are not identically provisioned.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, in various orders as necessary.

Although the above systems and methods for providing interference mitigation are described in reference to the Long Term Evolution (LTE) standard, one of skill in the art would understand that these systems and methods could be adapted for use with other wireless standards or versions thereof. For example, certain methods involving the use of a virtual cell ID are understood to require UEs supporting 3GPP Release 11, whereas other methods and aspects do not require 3GPP Release 11.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims. For example, an ordered sequence of multiple uplink cells may be selected by the coordinating node.

The invention claimed is:

1. A system for downlink multi-point transmission, comprising:
 a first base station in radio frequency proximity to a user device and with an established control connection with the user device;
 a second base station also in radio frequency proximity to the user device connected to a core network via the first base station in a mesh network; and
 a coordinating server coupled to the first and the second base station for coordinating transmissions to the first and the second base station to the user device, the coordinating server configured to:
 select the second base station based on selection criteria, the selection criteria including latency of each base station and perceived signal strength of each base station at the user device, the selection criteria including backhaul capacity of each base station and forwarding data path latency at each base station; and
 send scheduling instructions to each of the first and the second base stations to transmit data to the user device.

2. The system of claim 1, wherein the first and the second base station are eNodeBs and communicate with the coordinating server via the S1 and X2 protocols.

3. The system of claim 1, wherein one of the first and second base station are wireless local area network (WLAN) base stations.

4. The system of claim 1, wherein the coordinating server is further configured to select the first base station and additional base stations.

5. The system of claim 1, wherein the coordinating server is configured to send scheduling instructions to each of the first and the second base stations to transmit on a same frequency and a same subframe.

6. The system of claim 1, wherein the coordinating server is configured to send scheduling instructions to the first base station to transmit a first subframe during a first slot and the second base station to transmit a second subframe during a second slot.

7. The system of claim 1, wherein the first and second base stations and the coordinating server each further comprise a scheduler.

* * * * *